Sept. 8, 1970 A. T. MONACO 3,527,508

SLIDE ASSEMBLY

Filed Nov. 5, 1968

INVENTOR.
ANTHONY T. MONACO

BY Mueller, Aichele & Rauner
ATTORNEYS.

United States Patent Office 3,527,508

Patented Sept. 8, 1970

3,527,508

SLIDE ASSEMBLY

Anthony T. Monaco, Skokie, Ill., assignor to Motorola, Inc., Franklin Park, Ill., a corporation of Illinois Filed Nov. 5, 1968, Ser. No. 773,522
Int. Cl. F16c *29/00*
U.S. Cl. 308—3.6 16 Claims

ABSTRACT OF THE DISCLOSURE

A slide assembly, for supporting a chassis in a cabinet, is adapted to be locked in a closed position and includes a first elongated channel section having longitudinally extending edges bent to define a pair of tracks, with a notch cut out of each of the bent edges at the forward end of the channel shaped section. A second elongated channel section has opposite edges that slide in the tracks formed in the first channel section, and a spring is attached to, and carried within, the second channel section and is resiliently biased toward engagement with the first channel section. A pair of extensions on the spring drop into the notches on the first channel section whenever the slide assembly is in its closed position, so that the extensions in the notches lock the two channel sections against movement in either direction. The second channel section has a vertical extension on its forward end, and the extension has a detent hole located in it. A corresponding vertical extension is carried by the spring and it is resiliently biased against the vertical extension of the second channel member and has a detent engaging tab located in it. When the tab engages the hole, the notch engaging extensions on the spring are lifted out of engagement with the notches in the first channel section to permit sliding movement of the two channel sections.

BACKGROUND OF THE INVENTION

In mounting of electronic equipment within a cabinet, it is a common practice to mount the equipment on a movable chassis located to permit the chassis to be removed from the cabinet for maintenance and other purposes. By providing extendible track members or devices to enable movement of the chassis from the cabinet, the servicing and replacement of the electronic equipment is substantially facilitated. Although it is desirable to be able to remove the chassis containing the electronic equipment from the cabinet, it also is necessary to provide some means for locking the chassis within the cabinet during the normal operation of the equipment. The locking should be such as to prevent movement of the chassis in either direction, so that the chassis is firmly held in place in spite of inertial forces which may be encountered in the operating environment in which the cabinet is placed.

Most of the locking mechanisms used to secure a chassis in a cabinet use devices which engage the cabinet structure in which the chassis is positioned. A principal disadvantage of this type of construction is that it necessitates the provision of some interrelating part in the cabinet in order to engage a latching mechanism carried by the track members on which the chassis is moved. In addition, many such constructions involve relatively complicated lever and spring mechanisms which are expensive to manufacture.

It also is desirable to provide a means for disabling the locking mechanism during some manufacturing or servicing operations.

SUMMARY OF THE INVENTION

It is an object of this invention to lock the parts of a slide assembly against relative movement using a simple resilient locking member carried by one of the parts.

It is another object of this invention to disable the locking member used to lock the parts of a slide assembly against relative movement.

An assembly for slidably supporting two components relative to one another includes a pair of channel members, one being guided within the other for sliding movement relative to the longitudinal length of the channel members. A first one of the channel members carries a slot therein and the other channel member carries a slot engaging member which is resiliently biased toward the first channel member for engaging the slot whenever the two channel members are in a substantially closed position; and means are provided for locking the slot engaging member out of engagement with the slot.

DETAILED DESCRIPTION

Figure 1:
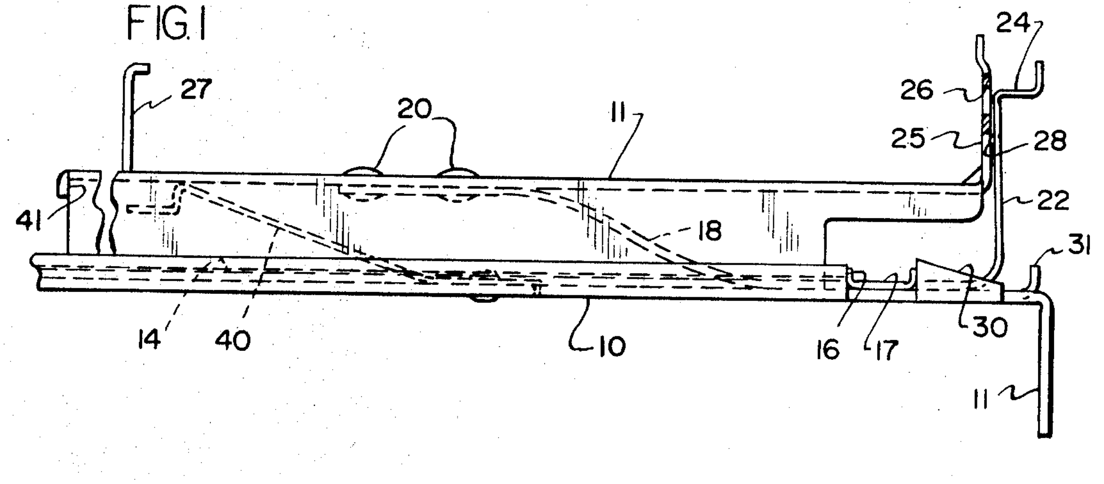
FIG. 1 is a side view of a preferred embodiment of a slide locking device, showing the slides in the locked or closed position.

Referring now the drawings, wherein like reference numerals are used throughout the several views to represent the same elements, there is shown an extendible chassis slide with a locking device in accordance with a preferred embodiment of the invention. The slide locking device operates with a fixed slide channel member or section 10, which may be attached to the cabinet in which the equipment is to be mounted. The cabinet has not been shown in the drawing in order to avoid unnecessary cluttering of the drawing, but the slide channel member 10 has, at one end, a flange 11 which may be placed in abutment with a portion of the cabinet and attached to the cabinet by any suitable attaching means. A moveable slide channel member or section 11 is guided for longitudinal movement within the channel member 10 and carries an equipment chassis (not shown) between a pair of extensions 25 and 27.

Figure 4:
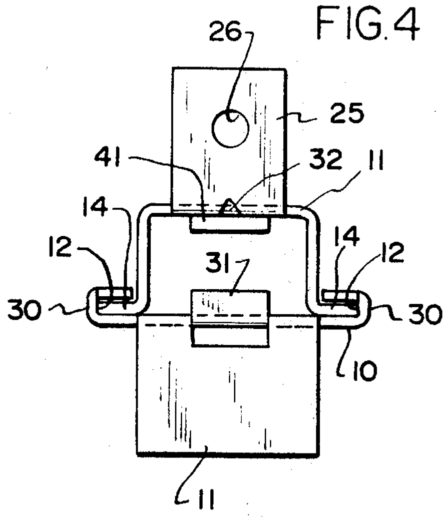
FIG. 4 is an end view showing the slide members with the spring removed.

As best seen in FIG. 4, in order to provide a sliding engagement between the channel members 10 and 11, the moveable channel member 11 has a generally U-shaped cross-sectional configuration, with the opposite longitudinally extending edges being bent outwardly to form a pair of track engaging members 14 which are positioned in sliding engagement within a pair of tracks 12 formed by a 180° bend in the edges of the fixed channel member 10. The span between the confronting edges of the two channel members 10 and 11 is chosen to provide a sliding fit between the channel members.

In order to lock the two channel members 10 and 11 together in a closed position so that the channel member 11 will not move with respect to the channel member 10, a pair of notches or slots 16 are cut in the track forming edges on each side of the channel member 10 near the forward edge thereof (the right end as viewed in FIG. 1). These notches are formed by removing part of the folded-over portion of the edges of the channel member 10 and are of a width sufficient to receive a pair of extensions 17 on a spring 18 which is mounted on the upper channel member 11 by means of suitable fasteners, such as a pair of rivets 20. The spring 18 is made of a single piece of spring steel and is bent for resilient engagement with the upper surface of the lower channel member 10; so that when the two channel members 10 and 11 are in their closed position, as seen in FIG. 1, the extensions 17 carried by the spring 18 extend into the slots 16 formed in the edges of the lower channel member 10. The extensions 17 are chosen to be of a width sufficient to just fill the width of the slots 16, so that a firm engagement between the two channel members is formed to prevent relative movement of the channel members 10 and 11.

In order to move the moveable channel member 11 to the right with respect to the fixed channel member 10 (as viewed in FIGS. 1 and 2), it is necessary to lift the spring extensions 17 out of engagement with the slots 16. To accomplish this, the spring 18 is provided with an upward extending portion 22 having a manually engageable tab 24 located at its upper end, so that the spring 18 may be lifted upwardly by the tab 24 to the position shown in the solid lines in FIG. 2, thereby lifting the extensions 17 out of engagement with the slots 16. The upper channel member 11 then is free for movement with respect to the lower channel member 10.

When using the slide assembly described thus far, it has been found desirable to provide some means for locking or temporarily holding the spring 18 in its upper position where it is out of engagement with the slots 16 in the channel member 10; so that the upper slide member 11 carrying the equipment to be removed from the cabinet may be easily pulled out and pushed back into position without interference by the spring 18.

In order to lock the spring 18 so that the extensions 17 are held out of engagement with the slots 16, an upper extension is provided on the end of the moveable channel member 11 to correspond with the upper extension 22 on the spring 18. The extension 25 has a detent hole 26 located in its center above the upper surface of the channel member 11. The spring extension 22 carries a detent projection or tab 28 which is aligned with the hole 26 in the upward extension 25 on the moveable channel member 11.

Normally, as viewed in FIG. 1, when the channel members 10 and 11 are in their locked position, the detent engaging tab 28 rides on the surface of the extension 25 at a position below the hole 26. The spring extension 22 is resiliently biased into engagement with the extension 25 at all times. Thus, when the tab 24 is lifted in order to disengage the spring extensions 17 from the slots 16, the tab 28 is raised to a position where it moves into the hole 26 so that the spring 18 then is locked in its upward position, as shown in the solid lines in FIG. 2. With the spring assembly 18 in this position, the slides 10 and 11 may be relatively moved from a closed to an extended position and back again without any interference from the spring 18.

When it is desired to relock the slide members into the position shown in FIG. 1, the extension 24 is moved slightly to the right (FIG. 2) to pull the tab 28 out of engagement with the hole 26. The spring 18 then snaps into its lower position, so that the extensions 17 fall into the slots 16 if the slide members 10 and 11 are in their closed position at that time.

Figure 2:
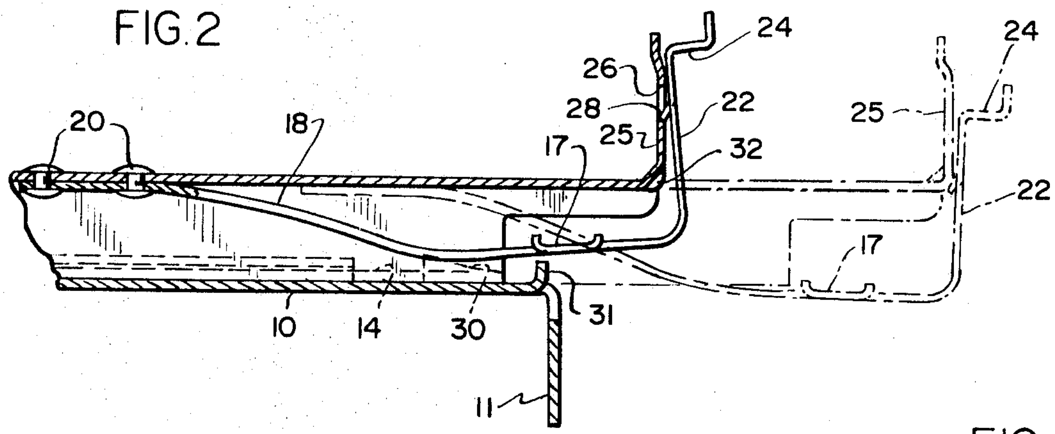
FIG. 2 is a partially cut-away side view of the slide locking device shown in FIG. 1, shown with the locking spring locked into its non-engaged position and showing in dotted lines the slides extended, with the locking spring in its lowermost position.
Figure 3:
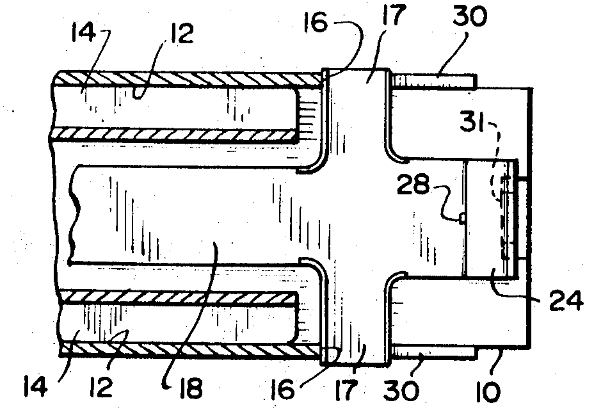
FIG. 3 is a partially cut-away top view of the slide locking device shown in FIG. 1, shown with the slide locking spring in the engaged position.

If for some reason the detent engaging tab 28 is released from the hole 26 when the slide member 11 is at its extended position with respect to the slide member 10, the spring 18 will assume a position relative to the slide member 11 as shown in the dotted lines at the right-hand portion of FIG. 2. Here it can be seen that the spring member 18 occupies a position which is somewhat below the upper surface of the lower channel member 10.

If it is desired to close the two channel members 10 and 11 when the spring is in the position shown in the dotted lines in FIG. 2, a camming surface 31 engages the lower cooperating surface of the spring 18 to lift the spring 18 into an upward position so that the extensions 17 are raised out of an engaging path with the sides of the channel member 10. In addition the edges of the channel member 10, at the forward end, are formed into a pair of camming surfaces 30, which may best be seen in FIG. 1, so that these camming surfaces 30 engage the extensions 17 on the spring 18 to lift the spring 18 up onto the upper surface of the edges of the channel member 10. In order to guide the spring 18 into a center position, a groove 32 is cut into the center of the upper channel member 11 at the point where the upper extension 25 is formed. This slot may best be seen in FIG. 4 and forms a guide for the tab 28, so that the spring 18 is guided and centered as the camming surface 31, in cooperation with the camming surfaces 30, lifts the spring side extensions 17 into engagement with the upper edges of the folded over sides of the lower channel member 10.

The height of the camming surface 31 with respect to the lowermost portion of the spring 18 may be chosen to cam the spring 18 to a position sufficiently high to enable the tab 28 to engage the detent hole 26 formed in the upward extension 25 of the movable channel member 11, so that upon closure the spring 18 is locked into its upward non-engaging position in order to enable ready movement of the slide members to an extended position if so desired. If the channel members 10 and 11 are to be locked into their closed position as shown in FIG. 1, the tab 24 should be moved slightly to the right to enable the spring to drop the extensions 17 into the slots 16 to lock the two channel members 10 and 11 together.

In order to prevent accidental movement of the movable channel member 11 to a position where it is pulled entirely out of the lower channel member 10, resulting in a possible dropping of the chassis carried on the channel member 11, a resilient stop spring 40 is suitably fastened to the lower channel member 10 and carries an extension biased into engagement with the inner surface of the upper channel member 11. When the upper channel member 11 is pulled outward to its farthest left extension, the abutment on the spring 40 engages a corresponding abutment 41 formed at the otherwise open end of the channel member 11. If removal of the channel member 11 from engagement with the channel member 10 is desired, the spring 40 may be depressed in order to clear the abutment 41 and the channel member 11 then may be pulled to the right, as viewed in the drawings, to fully remove it from engagement with the channel member 10. The resilient stop spring 40 and the abutment 41 are of a well-known type adapted to be cammed out of engagement when the channel members 10 and 11 are in their normal operating positions.

In utilizing the slide assembly which has been described, it should be apparent that generally a pair of slide assemblies will be provided to mount a chassis within a cabinet, with one of the slide assemblies being located on each side of the chassis which is mounted on top of the slide assemblies. The particular arrangement of the slide assembly with respect to the chassis and the cabinet in which it is to be mounted is not important, since the locking device and the channel members will operate in any suitable position.

In addition, it should be apparent that the relative shapes of the channel members at the point where they are slidably engaged also need not be as shown in the preferred embodiment; that is, the moveable channel member could have the U-shaped side extensions to form the tracks with the fixed channel member having the configuration of the moveable member 11 shown in the preferred embodiment. In such a case a pair of notches, or holes, could be cut into the fixed channel member; and the spring 18 could be provided with a pair of downwardly extending hole engaging projections on its lower side to perform the same function which is performed by the embodiment shown in the drawings.

What is claimed is:

1. An assembly for slidably supporting two components relative to one another including in combination:

first and second channel members, said second member being guided for longitudinal sliding movement relative to the first channel member, one of said channel members carrying guiding means and the other of said channel member in carrying corresponding guide engaging means, said first channel member having at least one slot therein;

a slot engaging means carried by the second channel member and resiliently biased toward the first channel member for engaging the slot on the first channel member when the two channel members are in a substantially closed position wherein the first and second channel members generally overlie one another throughout the major portion of their length; and means for locking the slot engaging means out of engagement with the slot.

2. An assembly according to claim 1, wherein the slot engaging member is a unitary spring structure connected to the second channel member and carrying an extension thereon for engaging the slot.

3. An assembly according to claim 2 further including a camming surface on the first channel member for lifting the spring structure to a position wherein the extension on the spring is moved to a position from which it can engage the slot whenever the first and second channel members are moved from an extended or open position to a closed position.

4. An assembly according to claim 2, wherein the means for locking the slot engaging means out of engagement with the slot including an extension on the end of the second channel member having an aperture therein, said extension extending substantially 90° to the longitudinal dimension of the second channel member, and said unitary spring structure including a corresponding extension at substantially 90° to the portion of the spring structure which carries the slot engaging extension, said 90° extension on the spring structure including a dentent engaging projection thereon, said projection engaging the opening in the extension on the second channel member to lock the spring structure out of engagement with the slot.

5. An assembly according to claim 4, wherein the spring structure also carries a manually engageable portion for facilitating movement of the spring out of the notch into engagement with the detent and vice-versa.

6. An assembly according to claim 1, wherein the means for locking the slot engaging member out of engagement with the slot includes a detent carried by the second channel member and a detent engaging member carried by the slot engaging means for engagement with the detent.

7. An assembly according to claim 6, wherein the detent is carried by an extension of the second channel member located at one end thereof and extending substantially at right angles to the length of the channel member and wherein the detent engaging member is carried by an extension of the slot engaging means.

8. In an assembly for slidably supporting a chassis in a cabinet including in combination:

a first channel-shaped fixed section having opposite longitudinally extending edges bent to define a pair of tracks;

a second elongated channel section having opposite longitudinally extending edges of a configuration matingly complimentary to said tracks slidably supported on the first channel section;

a portion of at least one of the edges of the first channel section being removed to form a notch therein; and means connected to the second channel section for engaging said notch, said engaging means being resiliently biased toward the first channel section.

9. An assembly according to claim 8, wherein the notch engaging means comprises a unitary spring structure attached to the second channel member and including an extension thereon passing through an opening in the second channel member for engaging the notch.

10. An assembly according to claim 8, wherein a portion of each of the extending edges which define the tracks in the first channel section is removed to form a notch therein, and wherein the channel engaging means connected to the second channel member engages the notches in both of the edges of the first channel member.

11. An assembly according to claim 8 where engagement of the notch in the first channel member by the notch engaging means locks the first and second channel members against relative movement in either direction.

12. Apparatus according to claim 8, further including means for locking the notch engaging means out of engagement with the notch, said locking means comprising an extension on the second channel member extending at substantially right angles to the channel member and carrying a detent thereon, and wherein said notch engaging means includes means for engaging the detent.

13. An assembly according to claim 12, wherein the detent engaging means is carried by the notch engaging means and is resiliently biased toward the detent.

14. In a slide assembly for supporting a chassis in a cabinet of the type wherein the slide assembly is adapted to be locked in a closed position, the combination comprising:

a first elongated, generally channel-shaped fixed section having opposite longitudinally extending edges bent to define a pair of tracks with a notch cut out of each of said bent edges;

a second elongated, generally channel-shaped section arranged for slideable movement within the first channel section and having opposite longitudinally extending edges that are slideable in the tracks of the first channel section;

a spring member attached to the second channel section and located within the second channel section, said spring member being biased toward engagement with the first channel section and carrying thereon a pair of extensions passing through openings in the second channel section and arranged for engagement with the notches on the first channel section and dimensioned to fit within the notches to lock the two channel sections against movement in either direction when the channel sections are in a closed position;

an extension attached to one end of the second channel section forming an angle of substantially 90° with respect to the second channel section and having a detent located therein; and a corresponding extension carried by the spring member extending substantially 90° with respect to the notch-engaging extension-carrying portion of the spring member and having a detent engaging member located therein, the location of the detent and the detent engaging member being such that when the detent engaging member engages the detent, the notch-engaging extensions on the spring member are lifted out of engagement with the notches in the first channel section to permit relative sliding movement of the two channel sections.

15. An assembly according to claim 14 further including means carried by the 90° extension on the spring member for providing a handle to lift the spring member into and out of engagement with the notch and with the detent.

16. An assembly according to claim 14 further including a camming surface on the end of the first channel section for lifting the notch-engaging extensions of the spring member to a position above the notches whenever the first and second channel section are moved from an extended position to a closed position.

References Cited

UNITED STATES PATENTS 2,277,703 3/1942 Kennedy et al. -------- 308—3.6

MARTIN P. SCHWADRON, Primary Examiner

F. SUSKO, Assistant Examiner